United States Patent [19]
Hansen

[11] Patent Number: 5,961,589
[45] Date of Patent: Oct. 5, 1999

[54] EMULATION OF ANALOG MODEM SIGNALING OVER IDSN FOR TRANSLATION-LESS INTEROPERABILITY WITH PSTN BASED H.324 SYSTEM

[75] Inventor: Carl Christian Hansen, Aloha, Oreg.

[73] Assignee: Intel Corporation, Santa Clara, Calif.

[21] Appl. No.: 08/926,413

[22] Filed: Sep. 9, 1997

[51] Int. Cl.[6] .............................. H04N 7/15; G06F 13/42; G06F 13/38
[52] U.S. Cl. ......................... 709/205; 709/204; 370/264; 345/330
[58] Field of Search ........................ 395/200.61, 200.34, 395/200.36, 200.35; 370/260, 352, 309, 496, 264; 455/416; 399/90.01, 202, 219, 93.21; 348/17, 15; 345/330; 300/10; 709/205, 204, 203, 206, 207

[56] References Cited

U.S. PATENT DOCUMENTS 5,666,362  9/1997  Chen et al. .............................. 370/354
5,774,857  6/1998  Newlin ..................................... 704/271
5,815,505  9/1998  Mills ....................................... 370/522

*Primary Examiner*—Daniel H. Pan
*Attorney, Agent, or Firm*—Blakely, Sokoloff, Taylor & Zafman LLP

[57] ABSTRACT

What is disclosed is a system for translationless videoconferencing interoperability between an analog modem based node and an Integrated Services Digital Network (ISDN) node having a videoconferencing engine coupled to the ISDN node, the videoconferencing engine generating videoconferencing data according to an analog modem protocol. Further the system has a modem emulator coupled to the videoconferencing engine, the modem emulator configured to model said data as analog modem data interpretable by the analog modem based node.

15 Claims, 6 Drawing Sheets

EMULATION OF ANALOG MODEM SIGNALING OVER IDSN FOR TRANSLATION-LESS INTEROPERABILITY WITH PSTN BASED H.324 SYSTEM

BACKGROUND OF THE INVENTION

1. Field of the Invention

The invention relates generally to telecommunications and videoconferencing. More specifically, the invention relates to telecommunications interfacing and provisioning for using compatible videoconferencing standards.

2. Description of Related Art

The Public Switched Telephone Network (PSTN) which facilitates voice (using telephones) and/or data (using modems) telephony throughout the world has in recent times been utilized to also deliver videoconferencing information. Towards that end, a standard has emerged for videoconferencing within the PSTN environment. This standard, known as the H.324 Recommendation, entitled "Terminal for Low Bitrate Multimedia Communication," specifies the usage of modems for videoconferencing over the PSTN, and thus, is referred variously in this specification as an "analog-modem based videoconferencing protocol." Prior to the H.324 recommendation, ISDN, or Integrated Services Digital Network, had been developed to evolve beyond ordinary PSTN modem networks. ISDN provides two "B" channels each of which can carry analog-encoded (ordinary voice telephony but not analog modem) information or digital (carrying data) signals. The advantage of ISDN over PSTN is that since ISDN is a digital transfer medium, the channels can be "bonded" or combined to provide a single channel with nearly twice the bandwidth of a single channel. Since each ISDN "B" channel provides up to 64 kilobits per second bandwidth, 2 bonded "B" channels can deliver 128 kilobits per second, which is much higher than the 33.6 or 56 kilobits per second currently given as the upper limit for V.34 modems operating over PSTN. To take advantage of the added bandwidth of ISDN, a new videoconferencing standard over ISDN known as the H.320 Recommendation, entitled "Narrowband Visual Telephone Systems and Terminal Equipment" was developed.

When a user at one node of a videoconferencing session communicates with another user at the other node over the same type of carrier, either ISDN or PSTN, the session can be carried out translationless since both nodes will utilize the same protocols. FIG. 1, however, shows that, when a node 110 utilizes an ISDN adapter 140, and consequently, the H.320 protocol, while the other node 120 uses an analog modem 130, and consequently, the H.324 protocol, a serious compatibility problem arises: the terminal at node 110 will be utilizing H.320 protocols while the terminal at node 120 will be expecting to receive H.324 protocols. Additionally, there is a modulation incompatibility since node 110 using ISDN (digital) modulation while node 120 uses analog modem type modulation. Though an ISDN channel can be used for analog voice telephony, the voice data is nonetheless digitized when being carried over the network. While the A/D (analog-to-digital) and subsequent (D/A) of voice telephony signals has been successfully achieved, the same cannot be said of analog modem signaling, such as V.34 (ITU-T (CCITT) Recommendation V.34, entitled "A Modem Operating at Data Signaling Rates of up to 28,800 bits/s for use on the General Switched Telephone Network and on Leased Point-To-Point 2-Wire Telephone-Type Circuits, published 1994) compatible signaling. As a result, an analog modem signal transmitted to a digital ISDN node or device would be incomprehensible and, thus, not communicate any useful information for facilitating videoconferencing or any other activity requiring data decoding precision.

One proposed solution for these incompatibilities, illustrated in the prior art of FIG. 1, has been to build a gateway or gateways at telephone company switching centers (Telco 150) which convert H.320 data (generated by ISDN-based videoconferencing software 115) to H.324 (PSTN-based videoconferencing software 125) and vice versa. However, such gateways are expensive to build and maintain and significantly interfere with the overall connection speed and connection quality for the session. These gateways add extra delay because of the need for layers of buffering to accomplish the translations and subsequent data streaming. The gateways themselves are complicated components and currently, have not been widely implemented. As such, if one Telco region does not provide such gateways, nodes within that region will be incapable of videoconferencing to other modulation incompatible nodes. The modulation incompatibility hinders also the use of software protocol translation/conversion schemes that will essentially be translating/converting incoherent data streams.

Thus, there is needed a simple, low-cost method and apparatus which will allow an ISDN based node and a PSTN (analog modem based) node to carry out a videoconferencing session without the need for protocol translation and gateways.

SUMMARY

What is disclosed is a system for translationless videoconferencing interoperability between an analog modem based node and an Integrated Services Digital Network (ISDN) node. The system has a videoconferencing engine coupled to the ISDN node such that the videoconferencing engine generates videoconferencing data according to an analog modem videoconferencing protocol. Further, the system has a modem emulator coupled to the videoconferencing engine such that the modem emulator is configured to model the data as analog modem data interpretable by the analog modem based node.

DETAILED DESCRIPTION OF THE INVENTION

Figure 1:
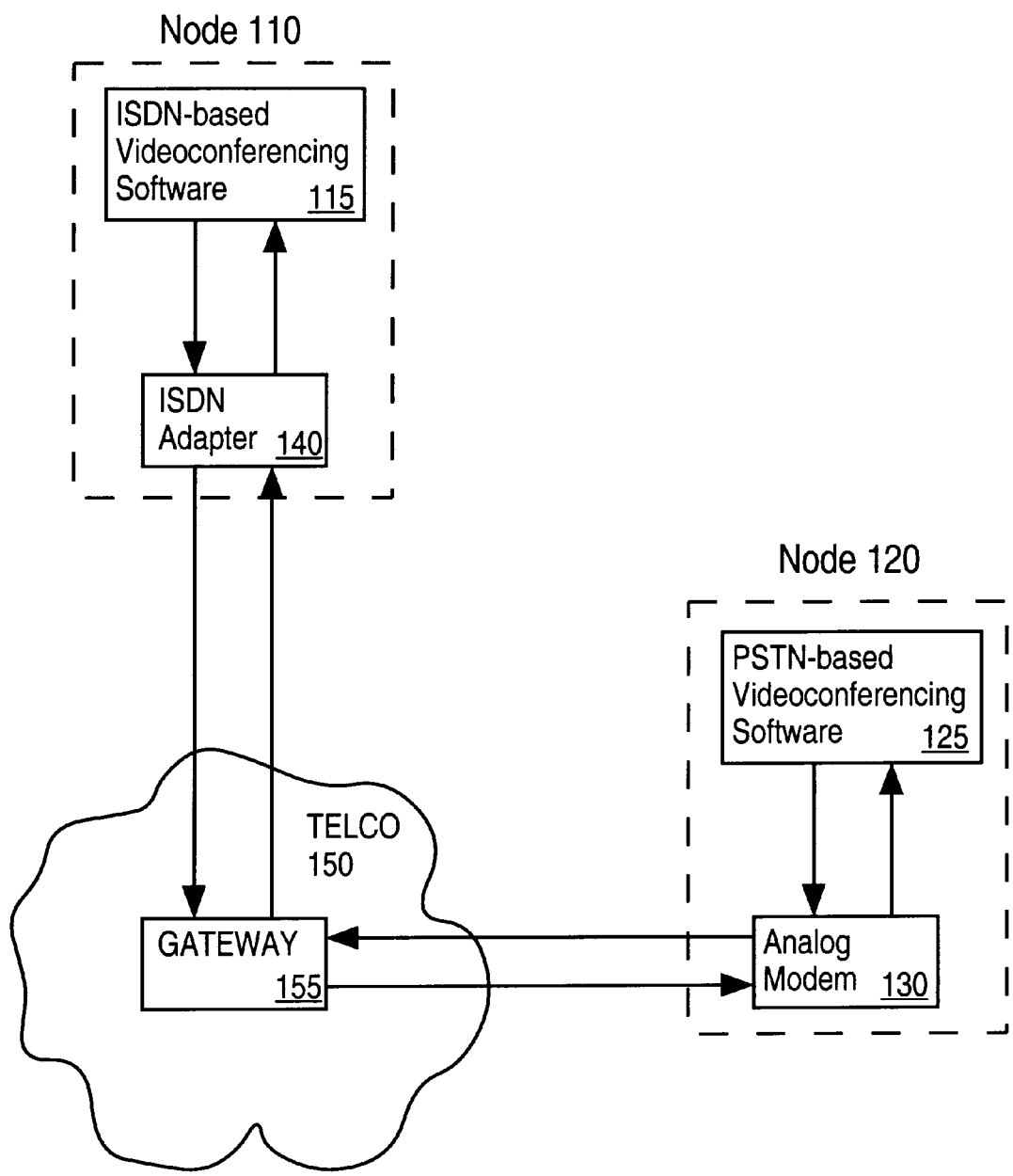
FIG. 1 illustrates the prior art of gateway-based ISDN to PSTN videoconferencing.
Figure 2:
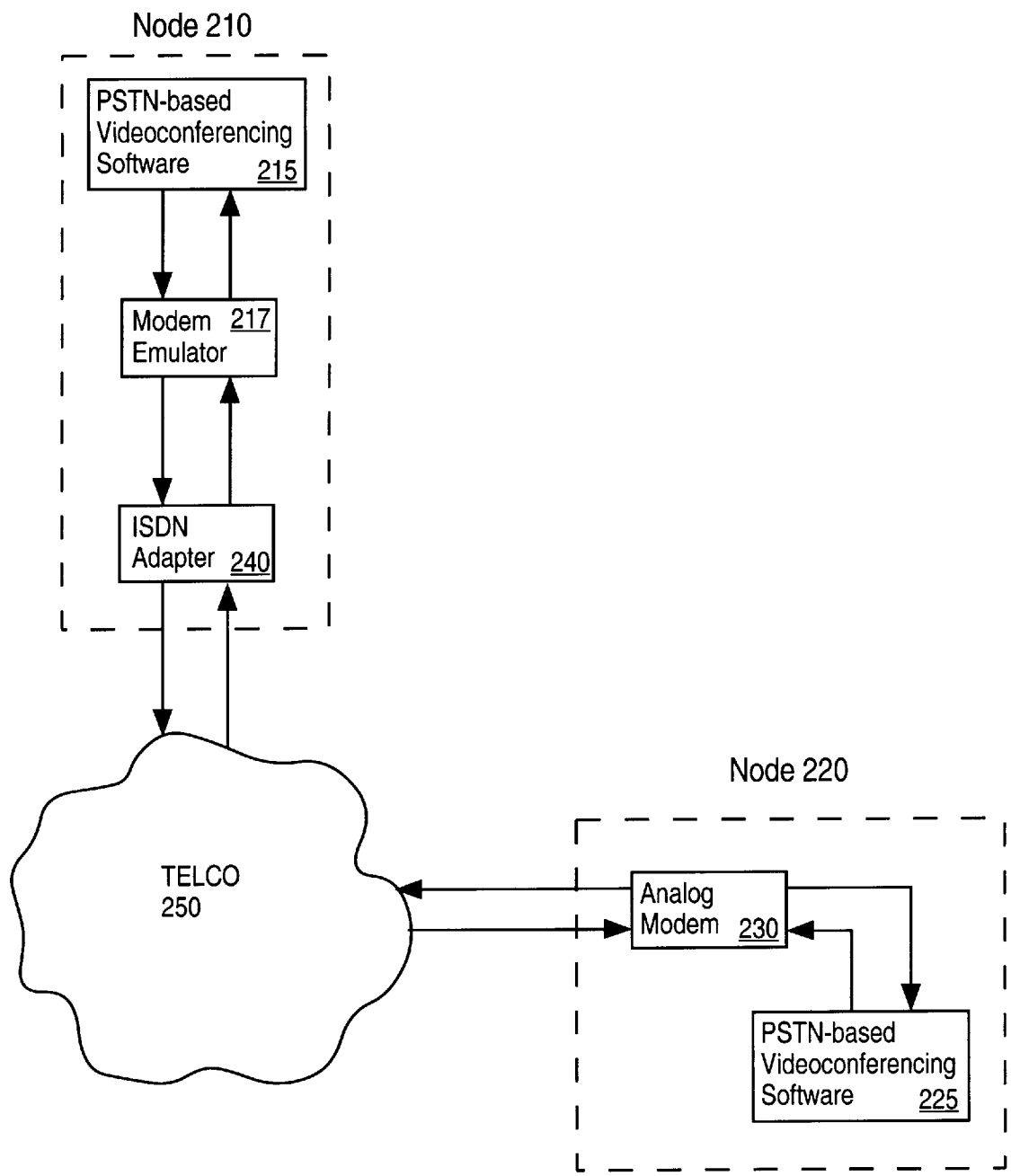
FIG. 2 illustrates a system diagram of one embodiment of the invention.

FIG. 2 illustrates a system diagram of one embodiment of the invention.

FIG. 2 illustrates a videoconferencing session with two nodes 210 and 220 which communicate with each other via telephone company networks labeled Telco 250. Nodes 210 and 220 can range from full-fledged computer systems to smart phones or other information devices which have the ability to communicate over lines provided by local telephone companies. In the system illustrated in FIG. 2, node 210 has the capability of communicating using ISDN (digital) while node 220 has the capability of communicating through PSTN (analog). Telco 250 includes the switches, hubs and other devices that are operated by telephone companies to facilitate both ISDN and PSTN type communications.

Node 210 includes a videoconferencing software interface 215 (also referred to as a videoconferencing engine) which recognizes and operates a videoconferencing standard for PSTN (using analog modems) such as the H.324 standard. Node 210 uses an ISDN interface to communicate via Telco 250, but yet according to this embodiment of the invention, can use analog modem (PSTN based) videoconferencing software to communicate data to/from the ISDN interface. According to one embodiment of the invention, a V.34 modem emulator 217 is interfaced with videoconferencing software 215 so that the H.324 data originating from software 215 appears as though it was analog encoded by a modem when it exits emulator 217. The emulator 217 can be implemented in either hardware, software, or firmware or a combination thereof and performs the functions of an analog modem, such as a V.34 modem, which transforms digital data into analog data and vice-versa to provide useful communication with a digital computer, for instance. If node 210 is ISDN capable, there is likely to be provided, either within the operating system or as a separate application, an ISDN driver software 219. ISDN driver software 219 interfaces the modem emulator 217 with a physical ISDN device such as an ISDN adapter 240. ISDN adapter 240 encodes data from computer 210 into samples for transmission over the digital ISDN lines provided by telephone company 250.

At the other end of the videoconferencing session is node 220 which has the capability of communicating on telephone company lines using an analog modem 230 to which it is coupled. Computer 220 includes a videoconferencing software interface 225 which is capable of recognizing and operating the H.324 standard or any of the other analog modem videoconferencing protocols. Preferably nodes 210 and 220 use software that utilize compatible videoconferencing protocols. Videoconferencing software 225 is interfaced to a modem driver 227 which interfaces modem 230 to other components of node 220 such that the modem 230 converts to analog any binary data received from node 220 for transmission and converts to digital any analog data received from the telephone company 250 through the telephone lines.

Modem emulator 217 provides a modem-like analog modeling to the digital data received by software interface 215. ISDN driver 219 and adapter 240 encode or sample the analog-like data ("analog-like" since the modeled data resides as binary) and send it out to Telco 250. From the viewpoint of Telco 250, when node 210 initiates a session with node 220, Telco 250 will recognize that computer 210 operates on a ISDN line and that node 220 operates on an ordinary PSTN line and, when routing data between the two, will provide digital-to-analog (D/A) and analog-to-digital (A/D) conversion such that the two nodes 210 and 220 can communicate. Both node 210 and node 220 may have ordinary telephone numbers assigned them, but Telco 250 will recognize that the telephone number assigned to the ISDN line for computer 210 is a digital line and will, therefore, convert the analog signals originating from modem 230 to digital. Similarly, digital signals coming from adapter 240 will be converted by Telco 250 into analog signals which can be received and demodulated by modem 230.

The insertion of a modem emulator in the data stream between videoconferencing software 215 and videoconferencing software 225 has the following effect. The frames of video and audio encoded by videoconferencing software 215 are a sequence of bitmaps compressed according to a specified "codec" (compression/decompression) algorithm. The resulting data, which is binary, is passed to the modem emulator 217 and modulated virtually within the modem emulator which produces amplitude and phase information which approximates the output of an analog modem. If the modem emulator were purely software, the signal generated by modem emulator 217 would be a digital representation of analog modem signaling. However, if implemented in conjunction with hardware elements, modem emulator 217 could consist of a D/A (Digital to Analog) hardware element that could more precisely generate the output of an analog modem. The precision or resolution of the waveform modeling needed will vary depending on the application, and the combination of hardware and software can easily be modified by one skilled in the art to achieve the desired result.

One alternative solution is to introduce a hardware modem into the node and couple the hardware modem instead of the signaling generated by a modem emulator, to the ISDN adapter. The ISDN adapter has an analog input for voice calls which the hardware modem could be tied into to send signals through. However, this approach suffers in that the Telco now assumes that the ISDN adapter is dialing a voice call, and thus, the Telco may do voice compression, something not intended for the videoconferencing session, such that the data received at the other end is prone to error. A hardware modem, which is analog device will generate handshaking, ring tones etc. and may also be expecting voltage swings on the line. However, the ISDN adapter will likely interfere with and perhaps cancel such PSTN signaling and thus, the hardware modem may not even operate properly. Furthermore, a physical hardware modem cannot sample at the rate of 64 Kilobits/Second as is required by the ISDN adapter and thus, the insertion of a physical modem (hardware) as opposed to software-emulated modem would not function properly (without sample rate conversion). The modem emulator can perform the proper sampling that an off-the-shelf modem cannot.

The ISDN adapter driver provides straightforward compatibility since the signal generated by modem adapter 217 is digital as the signal is to be passed through the system bus of the computer to the serial port (or network interface) to which the ISDN adapter is connected. The ISDN adapter transmits a rate adapted virtual analog waveform generated by the modem emulator to the Telco 250.

Telco 250, recognizing that the originating device is ISDN and that the destination is PSTN will pass the transmitted digital signal through a D/A converter. The resulting analog signal will behave and emulate a true modem signal such as one generated under the V.34 protocol and can be demodulated by modem 230 at the destination node. The signal decoded by the modem is compatible with the H.324 system at the destination and, thus a videoconferencing session can successfully take place. Likewise, when data is sent by modem 230, the modem emulator will analog approximate the incoming signal to make it understandable by videoconferencing software 215 of node 210.

Beyond the pre-existing D/A and A/D converters which the Telco 250 provides, the additional hardware, such as a gateway device, is extraneous for running a compatible videoconferencing session. No "interworking" is required and the system is translationless, providing for optimum signal definition. "Interworking" refers to the need to translate dissimilar protocols and codecs which can lead to a loss of signal definition and quality due to buffering overhead. Further with a translating gateway, a user at one node must call into the gateway and cannot switch from a voice call seamlessly into a videoconferencing session while still on-the-line. The user(s) must essentially call into the gateway to connect to each other which introduces a burden as a third-party is now required for videoconferencing which is preferably and optimally a direct dial.

Figure 3:
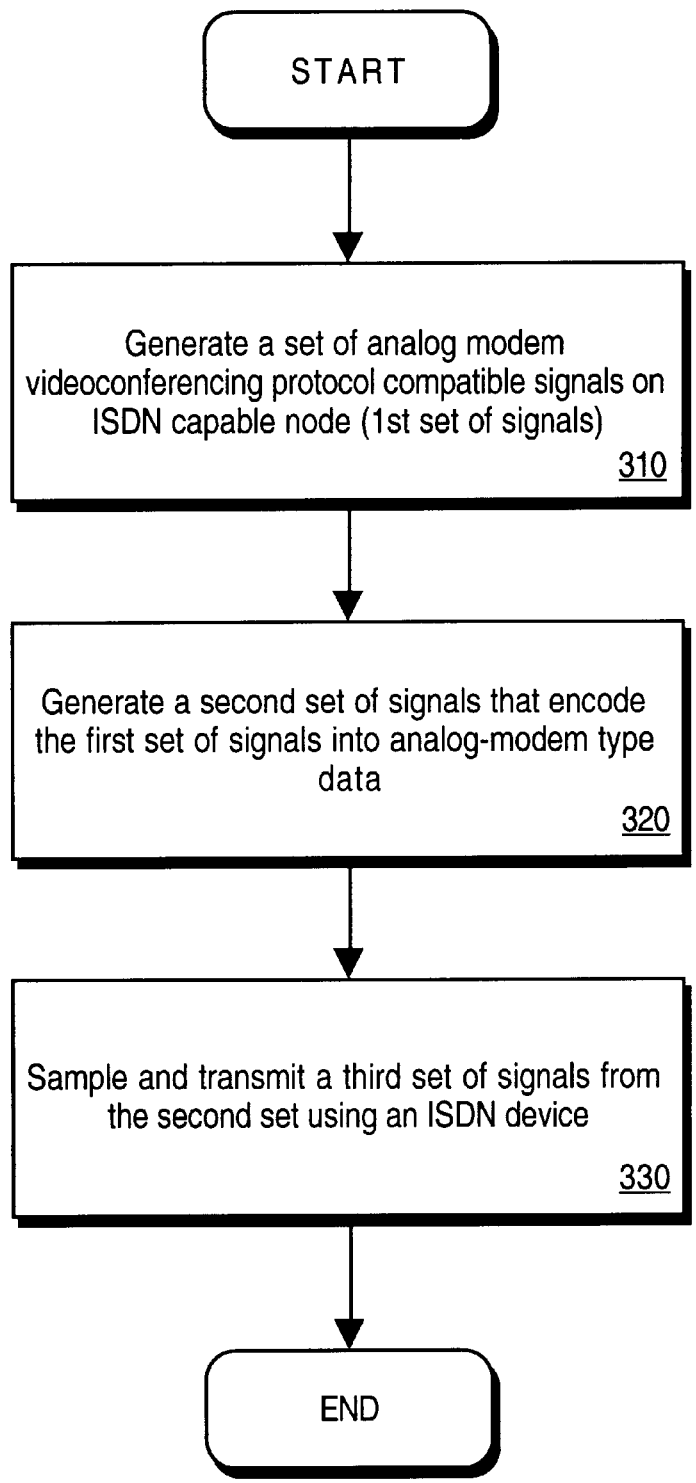
FIG. 3 illustrates a flowchart of transmitting videoconferencing information according to one embodiment of the invention.

FIG. 3 illustrates a flowchart of videoconferencing according to one embodiment of the invention.

Figure 6:
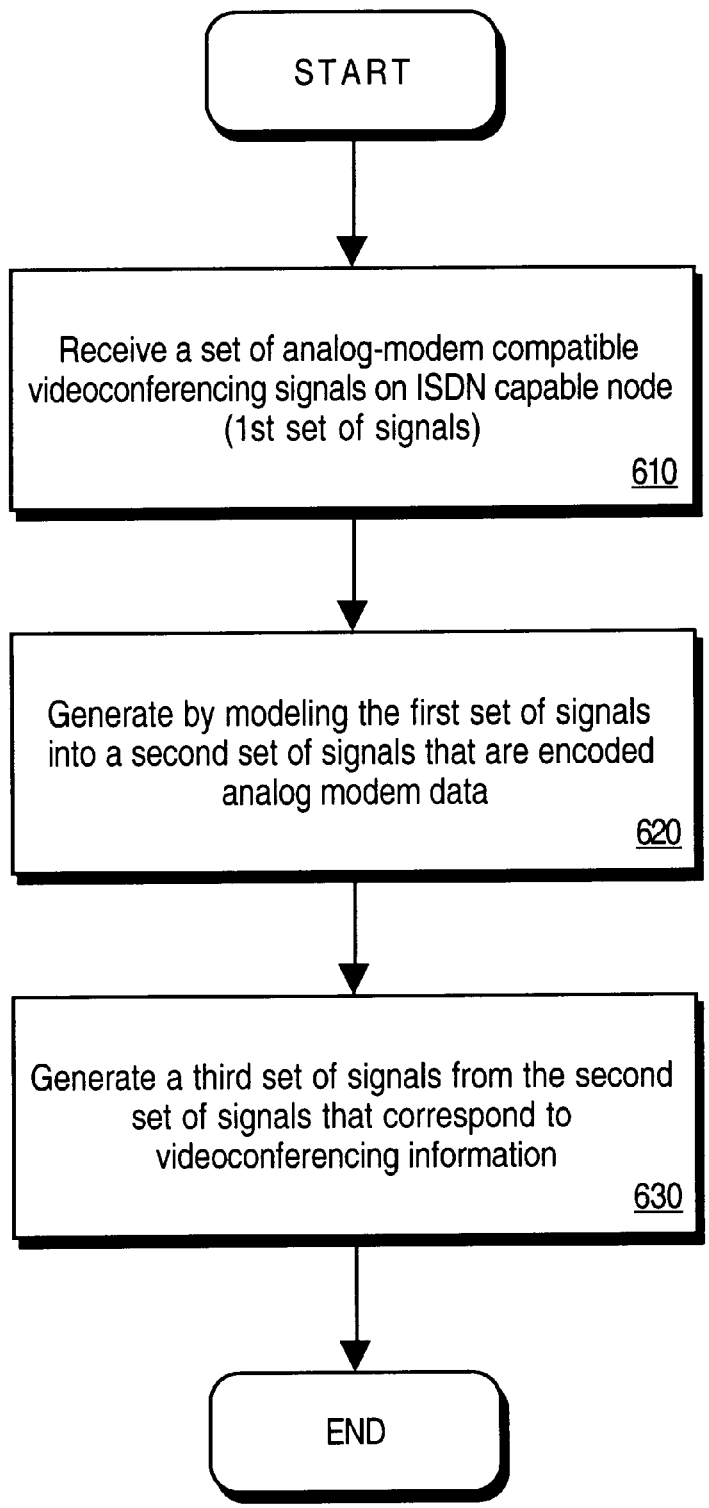
FIG. 6 illustrates a flowchart of receiving videoconferencing information according to one embodiment of the invention.

One methodology for translationless videoconferencing when the ISDN node transmits information is illustrated in FIG. 3. First, according to step 310, rather than generating a set of signals compatible with ISDN videoconferencing (e.g., H.320), a set of analog modem videoconferencing protocol compatible signals is generated by the videoconferencing software on the ISDN-capable node. This first set of signals is then passed to a modem emulator or other modeling system which generates a second set of signals which encode the first set of symbols as analog modem signals (step 320). The exact protocol used will vary according to the protocol used by the analog modem node. The ISDN adapter or network interface of the ISDN-capable node then transmits a third set of signals which are sampled from and approximate the second set of signals (step 330). This basic methodology may be extended or by the specifics of the videoconferencing or network components is merely exemplary. The ISDN node acting to receive videoconferencing information is illustrated in FIG. 6.

Figure 4:
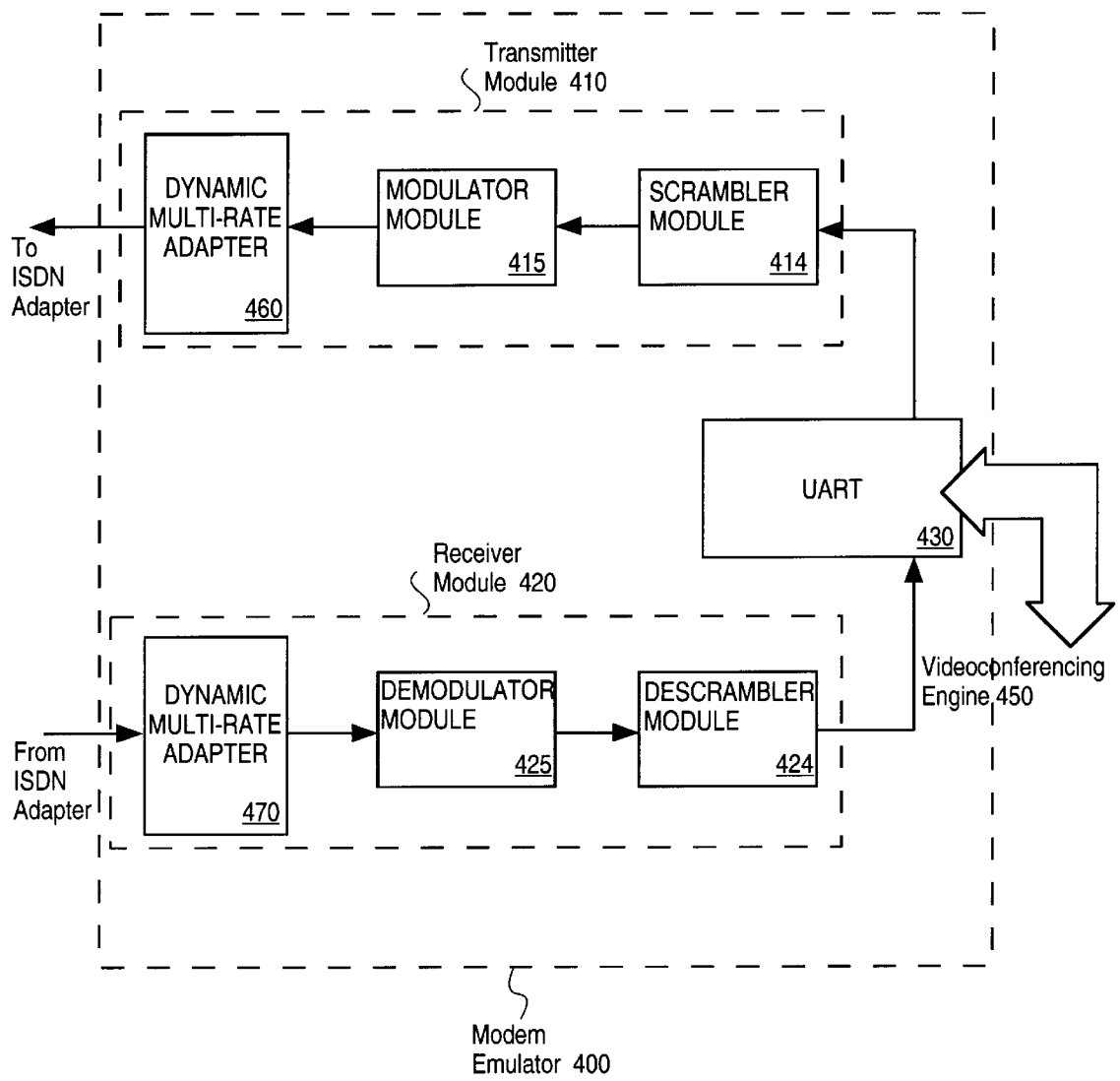
FIG. 4 illustrates a diagram of a modem emulator according to one embodiment of the invention.

FIG. 4 illustrates a modem emulator according to one embodiment of the invention.

In general, modem emulator 400 can be configured to emulate any form of modulation, such as PCM (Pulse Code Modulation) or QAM (Quadrature Amplitude Modulation) and can provide a data rate concomitant with that particular modulation type. If data to be transmitted is not piped to the modem fast enough, a steady data rate can be maintained by "filling" bandwidth unused by the transmission with nulls. For videoconferencing, the modem emulator makes use of a standard known as H.223 Recommendation, ITU-U, "Multiplexing Protocol or Low Bit Rate Multimedia Communications", March 1996, in order to accomplish filling if the delivery of data from the videoconferencing software is less than the desired bit rate as specified by the particular modulation type.

Most physical analog modems in the marketplace use a technique known as QAM (Quadrature Amplitude Modulation) which is also referred to as QASK (Quadrature Amplitude Shift Keying) to encode digital information (bits) into analog waveforms. Modem emulator 400 may be designed to emulate QAM to properly give the digital signal the appearance of analog modem data when received by the destination modem. Many modulation systems vary signals by phase or amplitude only, while QAM varies both phase and amplitude so that a larger number of distinct binary words can be represented by the combination of phase and amplitude. The modulation is balanced in that both sinusoid and cosinusoid components compose the modulated signal. The basic form of a QAM signal is $V_{qam}(t)=Ae(t)\sin(w_o t+0)+Ao(+)\cos(w_o t+0)$. Ae and Ao take on the same number of different amplitude values as the number of bits represented by each symbol. "Wo" is the angular carrier frequency at which the signal is modulated and 0 is the phase. By modeling signals according to this form, a physical analog modem can be emulated in software or in a combination of hardware and software.

The modem emulator 400 according to one embodiment of the invention may be logically divided into the following functional blocks when acting as data transmission interface: a scrambler module 414, a modulator module 415, and a first Dynamic Multi-rate Adapter 460. When acting as a data reception interface, modem emulator 400 may be divided into the following functional blocks: a descrambler module 424, a demodulator module 425 and a second Dynamic Multi-rate Adapter 470. In addition both the receive and transmit modes of the modem emulator 400 may make use of a UART (universal Asynchronous Receive/Transmit) unit 430.

When data is passed to the modem emulator from a videoconferencing engine 450 (using, for instance, the H.324 protocol) for output via the ISDN adapter to the other videoconferencing node, the data may require serialization. As a further step in emulating an analog modem signal, the UART 430 should add three bits—a stop bit, a start bit and a parity bit-for every block (such as a byte). The start bit is added at the beginning of the data block with the parity bit and then the stop bit appended to the end of a data block. Therefore, the function of UART 430 is the affixation of the start, stop and parity bits to facilitate asynchronous transfer that analog modems currently utilize. The start and stop bit mark the beginning and end of the transfer block, while the parity bit is used for error correction. Depending on whether the parity bit is used as part of the 8-bit data block or in addition to it, the total length of the transfer block will vary from session to session depending upon negotiated protocols between the two videoconferencing nodes. Modem emulator 400 is equipped with a UART module 430 which may perform the functions of a standard UART, but will disable its serialization function depending on the mode of data transfer (serial or parallel). Once the UART 430 has affixed start, stop and parity bits to the data block to produce the transfer block, the transfer block can, in one embodiment, be scrambled as with a physical modem. A data scrambler module 414 is used to ensure the data is random enough that clocking operations are reliable. Data scrambler is well-known in the art communications technology and one of ordinary skill in that art of would readily be able to design a data scrambler consistent with the operation of the modem emulator.

Once the data is scrambled, it is passed on to the modulator module 415. To emulate a V.34 compatible modem, a variation of QAM known as TCQAM (Trellis Code Quadrature Amplitude Modulation) is used for modulating binary data into analog. "Trellis" coding is employed to facilitate real-time error correction by producing a trellis code which is unique to each combination of bits in a transfer block. The modulator module 414 signal that models a QAM (with trellis coding, if desired). Modulator module 415 will performing mathematically and logically the functions of a physical modulator by providing, among other functions, level conversion. As employed in QAM, level conversion involves transforming a sequence of N-bits into M different amplitude levels. When multiplied by P different phase shifts the modulator 415 will be able to represent all possible combinations (words) of N-bits using the modulation scheme.

The modulator module 415 of modem emulator 400 will mathematically represent or model the scrambled data according to the basic sinusoidal and cosinusoidal forms given above. The modem emulator will thus be able approximate a sinusoid with the desired phase and amplitude and generate amplitude values corresponding to the amplitude of the modeled form at certain discrete sample points.

Before the sinusoidally modeled samples can be passed to the ISDN adapter the issue of sampling and clocking should be considered. The ISDN adapter is very strict in its requirement of delivering and receiving 8 KiloSamples per second no matter what the actual rate of data delivery by the subsystems within the information generating device (e.g. computer system). By contrast, a physical analog modem delivers data at varying bit rates according to line conditions. The rate for a standard V.34 28.8 modem, as it is known in the art, is around 30,000 bits per second (only 28.8 K is achieved because of decoding and overhead). But this is an ideal or optimal bit rate and depending upon the PSTN line conditions could widely vary. Whether the modulator module 415 responds to presumed line conditions or not, the sample rate specified for ISDN will likely vary from the sample rate provided by the modulator data.

To overcome this problem, the modulator module could be redesigned. However, then it would lose its functionality of emulating a modem signal which can be utilized for other applications. Further, redesigning the modulator module to generate a fixed number of samples per second may be difficult to achieve due to clocking differences between the ISDN and modulator. An ISDN adapter is clocked according to a clocking signal received from the network while, an analog modem is clocked internally and not from the PSTN network, and thus, a synchronicity problem may arise.

Another solution to the sampling rate dilemma, the one adopted in this embodiment of the invention, is the use of a multi-rate adapter. As illustrated in FIG. 4, a dynamic multi-rate adapter (DMRA) 460 receives samples from modulator module and provides them out to the ISDN adapter for transmission. DMRA 460 uses techniques such as sample rate adaptation, filling and/or buffering to cause a sampling rate of 8 KiloSamples per second. The DMRA 460 is dynamic in that it can modify its operating parameters based on any changes in the bit-rate or sample rate provided by modulator module 415. Among other functions, the DMRA 460 may also perform phase and frequency adaptation as a supplement/complement to adapting sampling rates. The process of sample rate adaptation is also referred to as "signal conditioning" and may techniques and apparatus for implementing it are well-known in the art.

Once the sample rate has been adapted, the sinusoidal samples are passed to the ISDN adapter. The ISDN adapter then transmits in digital form, the sinusoidal samples to the network. While in network transit, the digital samples are converted into analog signals via a D/A converter by virtue of the network's recognition that the recipient is non-ISDN and therefore, analog. The modem at the receiving node will pick up and demodulate the analog signals generating a non-return-to-zero (NRZ) serial digital signal. The physical modem at the receiving node will then decode and send the videoconferencing data to a software interface on the receiving node. When the videoconferencing engine on the receiving node translates this data, it will be translating data in a format it is capable of understanding, namely, H.324 data. In this manner, the ISDN node can utilize modem emulator 400 to communicate videoconferencing information to the analog modem receiving node using essentially its native videoconferencing protocol H.324. No protocol translation is needed since the protocols are identical. The modem emulator 400 assures that the digital data will appear like an analog-modem signal when decoded and since, the ISDN-capable node uses H.324 have the behavior of analog H.324 signaling.

The ISDN-capable node uses modem emulator 400 to also receive videoconferencing information from the non-ISDN node. While in network transit, analog data from the non-ISDN node will be converted to digital form in accordance with the network recognizing that the recipient of data is an ISDN node. When that data is received by the ISDN adapter it is first passed to second DMRA 470. DMRA 470 performs dynamic sample rate adaptation to accommodate the operating parameters of the demodulator module 425. The demodulator module 425 operates, in one embodiment, according to the same analog modem specification as modulator module 415 or according to a commonly agreed protocol/specification between the ISDN node and the non-ISDN node. DMRA 470 can buffer the ISDN 8 KiloSamples/second input such that the demodulator module can function appropriately at a lower bit rate, if desired. Demodulator module composes an analog modem signal from digital sinusoidal samples received by DMRA 470. Phase, frequency and amplitude are all analyzed and processed by the demodulator module 425 and then the data in bits or words (blocks of bits) is passed to descrambler module 424. Descrambler module 424 reassembles the data in its proper sequence and presents sequenced date to UART 430. UART 430, expecting to receive date in blocks, strips off any parity, stop and start bits and presents the raw data to videoconferencing engine 450. Videoconferencing engine 450, using an analog modem videoconferencing protocol such as H.324, then processes and outputs videoconferencing information such as text or graphics audio on the ISDN node. To have the capability of receiving, transmitting, and interpreting H.324 data, the ISDN node utilizes modem emulator 400 and thus, communicates without translation or interworking with a node using an analog modem. This is further advantageous in that multiple, and incompatible videoconferencing standards can be eliminated if desired. If two ISDN nodes are similarly equipped with a modem emulator, those two nodes can also use an analog modem standard such as H.324 to perform videoconferencing sessions.

In alternate embodiment, demodulator module 425 and modulator module 425 may be combined into a single dual input, dual output module since the functions performed by those modules are essentially inverses. Similarly, DMRA 460 and DMRA 470 or descrambler module 424 and scrambler module 414 may also be combined into single modules. The term "module" and "unit" as used alone refers to software, firmware, or hardware or a combination thereof.

Figure 5:
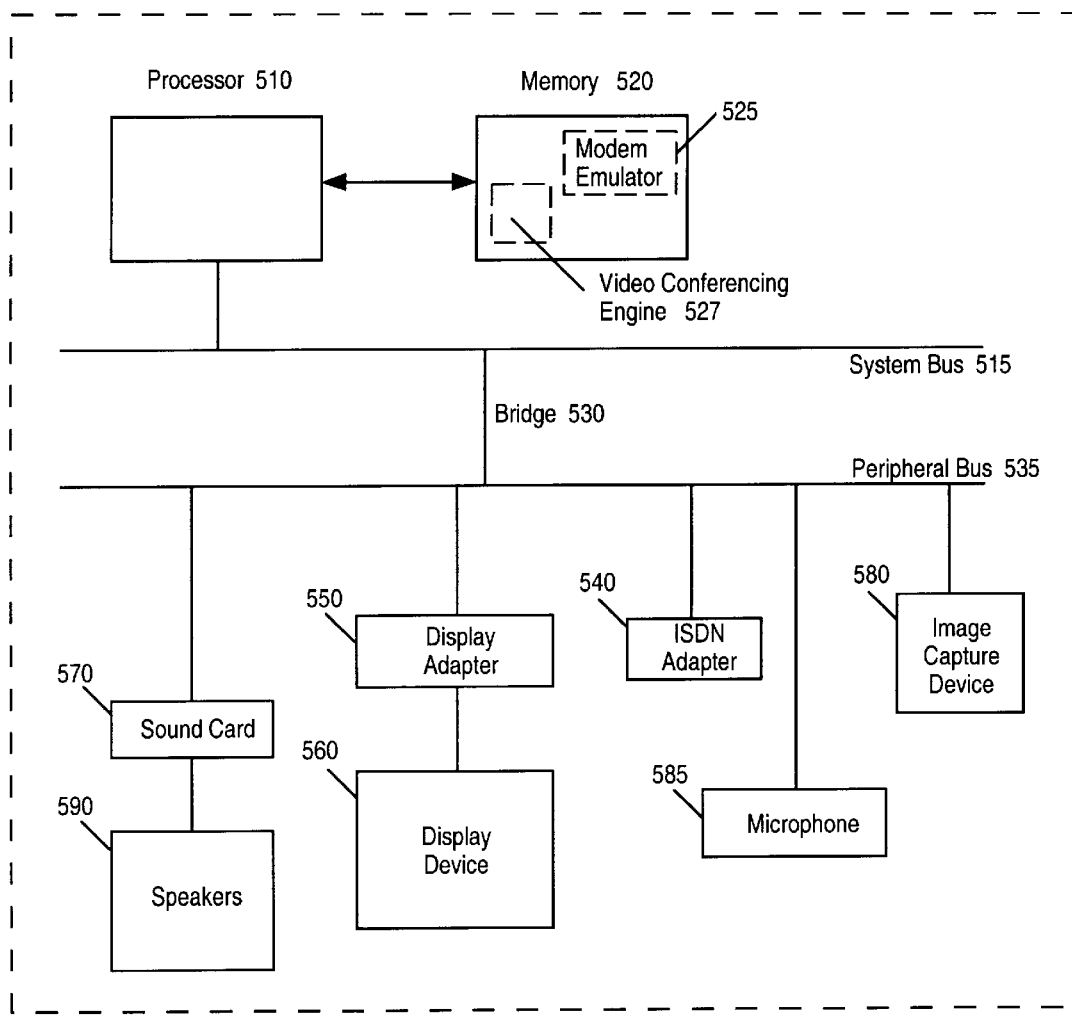
FIG. 5 illustrates a computer system capable of implementing videoconferencing according to one embodiment of the invention.

FIG. 5 illustrates an exemplary ISDN node according to one embodiment of the invention.

An ISDN node 500 may be any general purpose information device such as a computer system (pictured in FIG. 5) or a specific information device such as a videophone. The components of ISDN node 500 are therefore, merely exemplary of an ISDN-based system capable of videoconferencing with an analog modem based information device, referred to herein as a non-ISDN node.

ISDN node 500 can communicate, according to one embodiment of the invention, videoconferencing information using H.324 to a non-ISDN node (not pictured). ISDN node 500 has a system bus 515 and a peripheral bus 535 which are coupled together via a bridge 530. The bus-bridge-bus design of FIG. 5 is merely exemplary and can be otherwise implemented depending on design/complexity of the node 500. Processor 520 and memory 510 may be coupled directly with each other and to system bus 515 to transfer instructions, data and control information between each other and among other devices resident on node 500. Peripheral bus 535 couples to node 500 the following well-known devices: an image capture device 580 such as a digital camera, an ISDN adapter 540, a display adapter 550 such as a video card, a display device 560 such as a monitor, a sound card 570 and speakers 590. The above peripheral devices will not be described in detail so as not to obscure the invention, and are well-known in the art.

When sending videoconferencing information to the non-ISDN node, typically, first the image capture device 580 captures image data sending it over peripheral bus 535 then to bridge 530 and then to system bus 515. The captured image data is passed to a videoconferencing engine 527 such as an H.324 interface. Videoconferencing engine 527 is illustrated as a module of instructions and data structures resident in memory 520. The instructions for processing image and other data provided by videoconferencing engine 527 are executed by a processor 510 such as the Pentium w/MMX technology from Intel Corporation. Audio data, such as voice, can be passed to the videoconferencing engine through a microphone 585. Audio, video and other data are processed in the engine according to well-known codecs (compression/decompression algorithms) for transfer and/or storage.

Once audio, image and other data are processed by videoconference engine 527, the processed data is passed to modem emulator 525. Modem emulator 525 performs some or all of the functions illustrated in FIG. 4, and executes its instructions using processor 510. Modem emulator 525 generates digital sinusoidal samples which, when assembled, will model analog modem signals. These samples are sent out from system bus 515 (originating either from memory 520 or directly after processing from processor 510) over bridge 530 to peripheral bus 535. ISDN adapter 580 then prepares the samples for network transfer and transmits them to the destination node. Due to the operation of modem emulator 525, the destination node may be an analog modem based node. This allows both nodes to use similar videoconferencing engines and protocol when communicating.

When receiving videoconferencing information from another node, it is received first by ISDN adapter 580 as digital samples. These samples are passed to modem emulator 525, which with aid of processor 510, generates analog modem-like output. This output is forwarded to the videoconferencing engine which generates audio, video (image) and other data and outputs then onto system bus 515. Video or image data is transferred to display adapter 550 for output on display device 560. Audio data is sent to sound card 570 for processing and then output to speakers 590. In this manner, ISDN node 500 is capable of carrying on a videoconferencing session with another node which is analog, using a modem, for instance. Modem emulator 525 allows the videoconferencing engine 527 to be of the same protocol as the non-ISDN node, currently the H.324 protocol.

FIG. 6 illustrates a flowchart of videoconferencing according to another embodiment of the invention.

One methodology for translation-less videoconferencing when the ISDN node receives information is illustrated in FIG. 6. First, a set of analog-modem compatible videoconferencing signals a received on the ISDN capable node (first set of signals). The analog-modem compatible videoconferencing signals are then decoded. This generates a second set obtained by modeling the first set of signals, which resemble analog-modem data (step 620). The analog-modem data is recognized by the analog modem data is recognized by the analog-modem compatible videoconferencing engine (such as H.324). The videoconferencing engine can then generate from the second set of signals, a third set of signals which correspond to videoconferencing information (step 630). This videoconferencing information can then be displayed, output and rendered to output devices.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A system for translationless videoconferencing interoperability between an analog modem based node and an Integrated Services Digital Network (ISDN) node comprising:
   a first videoconferencing engine coupled to said ISDN node, said first videoconferencing engine generating videoconferencing data according to an analog modem videoconferencing protocol; and
   a modem emulator coupled to said first videoconferencing engine, said modem emulator configured to model said videoconferencing data as analog modem data interpretable by said analog modem based node, said analog modem based node incapable of ISDN communication, said ISDN node incapable of analog modem based communication.

2. A system according to claim 1 further comprising an ISDN adapter coupled to said modem emulator, said ISDN adapter configured to transmit digitally said analog modem modeled data.

3. A system according claim 1 further comprising a second videoconferencing engine coupled to said analog modem based node, said second videoconferencing engine of a protocol compatible to said first videoconferencing engine.

4. A system according to claim 3 wherein said protocol conforms to H.324.

5. A system according to claim 1 wherein said modem emulator emulates V.34 signaling.

6. A method for translationless videoconferencing interoperability between an analog modem based node and a ISDN based node comprising the steps of:
   receiving a first set of signals from said analog modem based node on said ISDN based node, said first set of signals compatible with an analog modem videoconferencing protocol;
   generating on said ISDN based node a second set of signals from said first set of signals, said second set of signals resembling analog modem data; and
   generating on said ISDN based node a third set of signals from said second set of signals, said third set of signals characteristic of videoconferencing information.

7. A method according to claim 6 wherein said step of generating said second set of signals includes the steps of:
   simulating the demodulating of said first set of signals into a bitstream; and
   descrambling said bitstream into said second set of signals.

8. A method according to claim 6 wherein said step of generating said third set of signals includes the step of removing start, stop and parity bits from said second set of signals to generate said third set of signals.

9. A method for translationless videoconferencing interoperability between an analog modem based node and a ISDN based node comprising the steps of:

generating on said ISDN based system a first set of signals characteristic of videoconferencing information, said first set compatible with an analog modem videoconferencing protocol;

modeling said first set of signals into a second set of signals, said second set of signals encoded as analog modem signals; and transmitting from said ISDN based node to said analog modem based node a third set of signals, said third set of signals sampled digitally from said second set of signals.

10. A method for translationless videoconferencing interoperability according to claim 9 wherein the step of modeling further comprises the steps of:

affixing start, stop and parity bits to selected portions of said first set of signals to generate transfer blocks;

scrambling said transfer blocks into scrambled data; and simulating the modulating of said transfer blocks into analog modem signals.

11. A modem emulator for coupling to an ISDN device, said emulator comprising:

a UART module;

a receiver module coupled to said UART module, said receiver module configured to receive samples from said ISDN device and generate a first set of data transfer blocks, said first set of data transfer blocks passed to said UART module;

a transmitter module coupled to said UART module and said ISDN device, said transmitter module configured to receive a second set of data transfer blocks from said UART module and to generate analog-modem compatible data in the form of digital samples, said ISDN device having no analog modem capability.

12. A modem emulator according to claim 11 wherein said transmitter module consists of:

a scrambler module coupled to said UART, said scrambler module configured to scramble said second set of data transfer blocks into a sequence of bits;

a modulator module coupled to said scrambler module to generate analog modem compatible data from said sequence of bits; and a dynamic rate adapter coupled to said modulator module, said dynamic rate adapter modifying the sample rate of said analog-modem compatible data to a sample rate compatible with said ISDN device.

13. A modem emulator according to claim 11 wherein said receiver module consists of:

a dynamic rate adapter coupled to said ISDN device, said dynamic rate adapter modifying the sample rate of said samples to a sample rate compatible with an analog modem device, a demodulator module coupled to said dynamic rate adapter, said demodulator module configured to generate from said modified sample rate samples a scrambled bitstream; and a descrambler module coupled to said demodulator module, said descrambler module configured to descramble said scrambled bitstream into said first set of transfer blocks.

14. A modem emulator according to claim 11 configured to generate videoconferencing information compatible with an analog-modem videoconferencing protocol.

15. ISDN-based computer system comprising:

a memory configured to store a first set of instructions corresponding to a videoconferencing engine and to store a second set of instructions corresponding to performing the function of a modem emulator; and a processor coupled to said memory, said processor configured execute said first set of instructions and said second set of instructions, said processor further configured to provide and interpret videoconferencing information to and from an analog modem based computer system, said first and second set of instructions modeling said videoconferencing information in analog form, and sampling said modeled information digitally for use by the ISDN device of said systems.

* * * * *